(12) United States Patent
Bruck

(10) Patent No.: US 8,641,845 B2
(45) Date of Patent: Feb. 4, 2014

(54) METHOD OF DETERMINING BOND COVERAGE IN A JOINT

(75) Inventor: Gerald J. Bruck, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 289 days.

(21) Appl. No.: 13/005,640

(22) Filed: Jan. 13, 2011

(65) Prior Publication Data

US 2012/0180928 A1 Jul. 19, 2012

(51) Int. Cl.
*B32B 41/00* (2006.01)

(52) U.S. Cl.
USPC ...... 156/64; 156/272.4; 156/275.5; 73/150 A; 73/150 R

(58) Field of Classification Search
USPC .................... 156/64, 272.4, 272.5, 378, 379; 228/104; 73/150 A, 150 R; 438/118, 438/119
See application file for complete search history.

(56) References Cited

U.S. PATENT DOCUMENTS

| | | | |
|---|---|---|---|
| 3,155,622 A | 11/1964 | Kazenas et al. | |
| 3,243,876 A | 4/1966 | Molina | |
| 3,351,760 A | 11/1967 | Brown | |
| 3,496,630 A | 2/1970 | Duff et al. | |
| 3,956,631 A * | 5/1976 | Crosby, Jr. | 378/58 |
| 4,431,465 A | 2/1984 | Mizuhara et al. | |
| 4,914,953 A | 4/1990 | Viscovich | |
| 4,940,633 A * | 7/1990 | Hermansen et al. | 428/324 |
| 4,944,185 A | 7/1990 | Clark et al. | |
| 4,955,740 A | 9/1990 | Renz et al. | |
| 5,012,502 A * | 4/1991 | Battin et al. | 378/58 |
| 5,785,913 A | 7/1998 | Clark et al. | |
| 5,833,795 A * | 11/1998 | Smith et al. | 156/272.4 |
| 5,841,034 A * | 11/1998 | Ball | 73/800 |
| 6,340,113 B1 | 1/2002 | Avery et al. | |
| 6,530,971 B1 | 3/2003 | Cohen et al. | |
| 7,010,987 B2 | 3/2006 | Antonelli et al. | |
| 7,179,558 B2 | 2/2007 | Residorf et al. | |
| 7,422,141 B2 | 9/2008 | Pikulski | |
| 7,462,854 B2 | 12/2008 | Pinchot | |
| 2003/0042047 A1 | 3/2003 | Shimizu | |
| 2004/0115340 A1 | 6/2004 | Griego | |
| 2007/0152026 A1 * | 7/2007 | Suh et al. | 228/193 |
| 2009/0220813 A1 | 9/2009 | Reisdorf et al. | |

* cited by examiner

Primary Examiner — George Koch

(57) ABSTRACT

A method of determining bonding agent coverage in a joint between a first substrate (10) and a second substrate (12), including: dispersing a marker material (18) throughout a bonding agent (16); melting the bonding agent (16) but not the marker material; solidifying the melted bonding agent (16) to form an actual bond (24) in a joint between the first substrate (10) and the second substrate (12); detecting the marker material (18) in the joint through at least one of the substrates to ascertain an actual bond (24); and comparing the actual bond (24) to an expected bond (28) for the joint to determine the bonding agent coverage.

10 Claims, 3 Drawing Sheets

METHOD OF DETERMINING BOND COVERAGE IN A JOINT

FIELD OF THE INVENTION

The invention relates to non-destructive evaluation of bonded joints. Specifically, it relates to non destructive evaluation of bonding agent coverage as evidenced by a presence of marker material infused in the bonding agent.

BACKGROUND OF THE INVENTION

Conventional methods of bonding substrates together often rely on a bonding agent disposed between the substrates to produce an intended bond within a joint. For various reasons the bonding agent may not produce the intended bond, but may produce an actual bond that may be only a portion of the intended bond. In order to evaluate bonding agent coverage and the resulting actual bond without destroying the resulting product, non-destructive testing (NDT) and non-destructive evaluation (NDE) methods have been developed. Non destructive evaluation (NDE) of joined substrates is an important part of ensuring that a resulting component will perform up to requirements. Should an actual bond be significantly inferior to an intended bond a joint strength will be compromised, and the component may fail. Extended quality requirements and use of bond materials of poor contrast with base materials requires improved NDT and NDE methods. Consequently, there is room for improvement in the art.

BRIEF DESCRIPTION OF THE DRAWINGS

The invention is explained in the following description in view of the drawings that show.

DETAILED DESCRIPTION OF THE INVENTION

Figure 1:
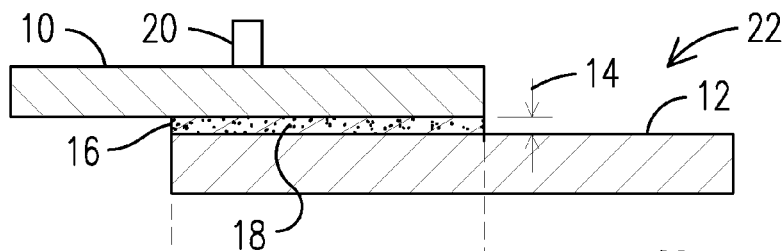
FIG. 1 is a side view of an embodiment of a component to be non destructively evaluated.

Radiography has been used conventionally to perform NDE of bonds formed between substrates. Radiography can employ numerous different types of radiation, commonly including x-rays or gamma rays, but also including neutron radiography. Which technique is used depends on the different property of a material whose presence is sought. For example, x-rays or gamma rays may be used to detect particles of differing density, while neutron radiography may be used to detect materials with a high "neutron capture" property. Radiography may be taken of a joint to determine a presence of the bonding agent within the joint. Where there is bonding agent an actual bond is presumed. Where there is no bonding agent a lack of an actual bond is presumed. Once an actual bond is determined it can be compared to the intended bond. If the two are the same then bonding agent coverage is full, or 100%. Otherwise, the actual bond is inferior to the intended bond.

Joints resulting from multiple joining methods can be evaluated using NDE. The methods may include but are not limited to brazing, soldering, solid state diffusion bonding (welding), and transient liquid phase bonding. In the context of, for example, gas turbine engine components, it is desirable to braze high temperature nickel based alloys (such as: "X" (UNSN06002); "625" (UNSN06625); and "617" (UNSN06617)) with high temperature rated nickel based braze fillers (such as "BNi-2" (AMS 4777)). In particular, using a bonding agent with properties similar to the substrate may produce a bond with properties close to the substrate. However, x-rays by their nature, indicate differences in density within an object, such as a resulting component. If there is little difference between a substrate density and a bonding agent density (i.e. little density contrast), x-ray radiography, which is commonly used for NDE of joints, may not indicate the difference, or may do so at a low resolution. X-ray radiography of a bond between substrates made using a bonding agent with properties similar to the substrate, such as the above example, will often not be able to distinguish the bonding agent from the substrate, rendering the NDE less effective.

In order to improve the resolution of x-ray radiography, a bonding agent with a different density has been employed. In the above example the nickel based braze filler may be replaced with a lower temperature gold based filler (such as "BAu-4" (AMS 4787)). The resulting bond produced may be more visible in the NDE x-ray radiography because the bonding agent is different than the substrate. However, the filler has lower temperature properties than the substrate, which may reduce high temperature performance characteristics of the resulting component. This is undesirable when the component is a gas turbine engine component intended to be used in extremely high temperature environments. For example, substrates "X", "625", and "617" melt at temperatures above 1250° C., while a gold-based filler such as "BAu-4" melts at about 950° C. Furthermore, gold is more expensive, making the component more expensive, which is also undesirable.

The present inventor has devised an innovative way to enable the use of a wide variety of marker materials while simultaneously improving the quality and variety of NDE techniques that can be used to evaluate the bonding agent coverage. As used herein, bonding agent coverage, i.e. a measure of the actual bond to an ideal bond as indicated by bonding agent coverage, may be measured using any metric desired. For example, bonding agent coverage may be taken to mean the percentage of surface area intended to be bonded that is actually bonded. The cross section may be a cross section of the actual bond, which would measure the actual bond from one substrate to another, which may pick up voids floating within an actual bond but surrounded by bonding agent. Bonding agent coverage may refer to a volume between surfaces to be bonded that is actually filled with bonding agent. Whatever metric is used, the concept covers how the actual bond compares to the intended bond.

Specifically, in the method disclosed herein, marker material may be introduced into a bonding agent. The marker material will have a property different than the substrate, which can be measurable through the substrate. The different property may be a different density, a different magnetism, a different magnetism at certain temperatures, and/or a different radioactivity. Marker material may take any form, ranging from particles to cylinders, wires, mesh etc. The bonding agent may be a paste or a foil or other preform. The marker material may be introduced such that it is dispersed into the bonding agent essentially uniformly, or it may be patterned. The marker materials may be joined using any bonding technique which permits a bonding agent, i.e. an interlayer, such as brazing, soldering, diffusion bonding, and transient liquid phase bonding. The resulting actual bond can be non-destructively evaluated by measuring for the presence of the different physical property throughout the joint, and comparing an actual bond presumed present where the different physical property is found to an intended bond. When the resulting component requires a specific gap between the substrates in the resulting bond, such as in a braze operation, the marker material can be sized to produce the proper "fit-up" between the substrates during brazing. Further, the marker material may have a greater coefficient of thermal expansion than the bonding agent and may take a shape that produces a compressive force on the bond, and therefore the joint, when solidified, producing a stronger joint. For example, an elongated shape for the marker material such as a cylinder, wire, or mesh, would contract relatively more when cooled, and thus may work well to produce the desired compressive force on the joint.

When speaking of bonding processes, any implementation of the process that accomplished the objectives is permissible. For example, if the bonding process chosen is a brazing process, the type of brazing operation is not limited, and may include torch, furnace and induction brazing etc. The same applies for the other bonding processes. Further, the marker material selection is not limited to the below examples. The primary requirement is that any marker material used does not interfere with the bonding process. For example, if the bonding process is a brazing process, the marker material must not alloy with the braze material at brazing temperature. In other words, the bonding process, whichever it is, must simply occur "around" or in spite of the presence of the marker material. Otherwise, the selection of marker material is limited only by the design requirements.

Turning to the drawings, FIG. 1 shows a side view of a first substrate 10, a second substrate 12, a gap 14 between the substrates, and a bonding agent 16 infused with marker material 18 to form a component 22. In an embodiment the marker material 18 may have a different ferromagnetic property than the substrate. For example, the first substrate 10 and second substrate 12 may be a non magnetic nickel based superalloy, and the bonding operation may be a brazing operation. The bonding agent may be braze material "BNi-2", with the following composition: 3.10% boron; 7.0% chromium; 3.0% iron, 82% nickel; and 4.5% silicon, and the marker material may be iron, which is ferromagnetic. However, these examples are not meant to be limiting. After the bonding process is complete, a magnetic transducer may be used to measure through either substrate to check for a presence of ferromagnetic particles. Transducers that may typically provide for such inspection include the Ferritescope, Severn Gauge, and the Magne-Gauge, as are known to those of ordinary skill in the art.

In an embodiment the marker material 18 is in the form or particles dispersed throughout the bonding agent 16, which may be a paste or foil. An exact disbursement is not required. What is required is that the marker material 18 be infused such that when the bonding operation is complete, enough marker material 18 will be present in the bonding agent 16 that an operator looking for the marker material 18 would notice a lack of the marker material 18 where marker material 18 is expected, such as in an intended bond. In other words, the marker material 18 should be present enough throughout the bonding agent 16 that its absence would be noticed when measuring for it. A presence of the marker material 18 must be discernable, and a lack of presence of the marker material 18 within an intended bond must also be discernable. In one embodiment a method to ensure the presence of the marker material 18 is to infuse the marker material 18 into the bonding agent as evenly as possible and at a concentration as necessary to be able to observe the marker material 18 within an intended bond. For example, if a void in an intended bond of over a threshold size is unacceptable, the marker material 18 must provide resolution at least down to the threshold size. In another embodiment the marker material 18 may be disposed in a foil in a recognizable pattern, as will be discussed below.

Figure 2:
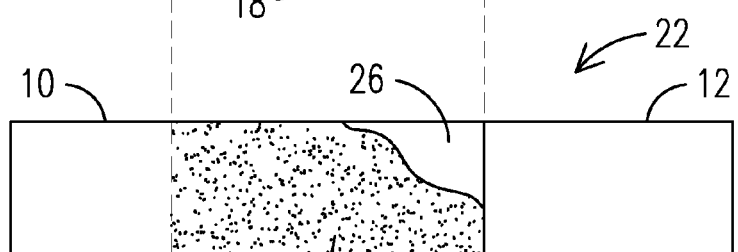
FIG. 2 is a top view of the component of FIG. 1.
Figure 3:
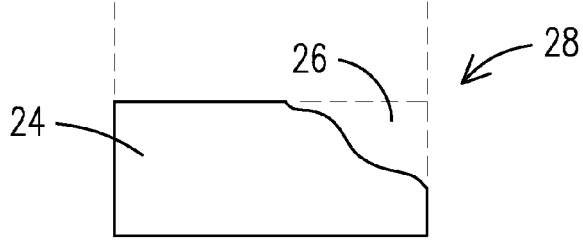
FIG. 3 is a schematic of an intended and actual bond of FIG. 1

After the bonding process the joint can be checked to evaluate the joint for actual bonding agent coverage. FIG. 2 shows a top view of a component 22 produced. Actual bond 24 is represented by the shaded area and indicates the presence of the marker material 18 (i.e. ferromagnetic iron particles) as measured through a substrate, which indicates an actual bond. Unbonded area 26 as indicated by the unshaded area indicates a lack of presence of the marker material 18, which indicates a lack of an actual bond in an area where bonding agent 16 was expected, i.e. in an intended bond. FIG. 3 depicts the actual bond 24, and an intended bond 28, which is the actual bond 24 and the unbonded area 26 together. From this it is clear that bonding agent coverage, and hence bond quality can readily be evaluated without destroying the component 22.

In a variation of this embodiment, the marker material 18 may possess a different magnetic property but only at limited temperatures. Such a marker material 18 may be particularly useful when non magnetic components are desired during operation, but such that at temperatures present during a NDE the different magnetic property would be discernable. Examples of such temperature-dependent magnetic materials include paramagnetic materials such as aluminum, uranium and platinum—which become more magnetic when they are cooled to low temperatures.

Figure 4:
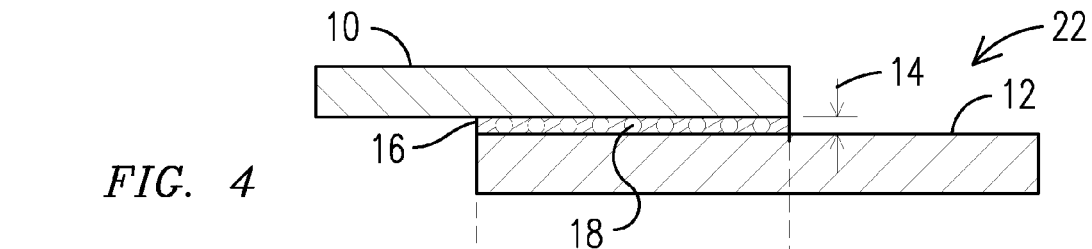
FIG. 4 is a side view of another embodiment of a component to be non-destructively evaluated.

FIG. 4 shows the first substrate 10, second substrate 12, gap 14 between the substrates, and bonding agent 16 infused with marker material 18. In an embodiment the marker material 18 may have a different density than the substrate. For example, the first substrate 10 and second substrate 12 may be a nickel based superalloy, and the bonding operation may be a brazing operation. The bonding agent may be braze material "BNi-2." Nickel based alloy density is commonly about 8.0 to 8.4 gm/cm$^3$. Marker materials with different density may include tungsten (19.4 gm/cm$^3$), tantalum (16.7 gm/cm$^3$), beryllium (1.9 gm/cm$^3$), and titanium (4.5 gm/cm$^3$), though other materials may be used. Tungsten melts at approximately 3410° C., tantalum at approximately 2996° C., beryllium at approximately 1278° C., and titanium at approximately 1660° C. All of these melting temperatures are approximately equal to or higher than the melting temperature of nickel based super alloys, and notably above the melting temperature of braze material "BNi-2." In an embodiment tungsten is used because it has the greatest density difference and the highest melting temperature. It is not important that the marker material 18 density be higher or lower than the substrate, simply that it be different. During the brazing process the bonding agent may melt while the marker material 18 may not. After the bonding process is complete, radiography, such as x-ray or gamma ray may be used to measure through either substrate to check for a presence of particles of differing density.

When the bonding process permits or requires a gap 14 between the substrates, such as a brazing process, the marker material 18 may serve an additional function of establishing a proper fit between the first substrate 10 and the second substrate 12. This is possible in cases such as the above where the marker material 18 melts at a temperature higher than does the bonding agent and the bonding process occurs below the melting temperature of the marker material 18. In such cases the marker material 18 does not melt and therefore maintains its shape and dimensions. Consequently, the marker material may maintain a minimum gap 14 by virtue of its presence in the gap 14. The gap dimension may be important for several reasons. When speaking of the bonding process itself, the process used may itself prefer a certain gap. Specifically, when the process is a brazing process, a bonding gap of 0.038 mm at braze temperature is considered ideal in many circumstances. (It is worth noting that the dimensions of the particle at bonding process temperatures may be different than the dimensions at other temperatures, and this difference may be accounted for when selecting the proper marker material 18.) A narrower gap 14 may inhibit bonding agent distribution throughout the joint, producing an actual bond inferior to the intended bond. Too wide a gap 14 may make capillary flow difficult and eventually result in joint strengths as weak as the bonding agent 16. In terms of manufacturing, components 22 will vary in strength from component to component if a gap size varies from component to component due to tolerances etc. Using a marker material 18 that sets the gap 14 by virtue of its own size may reduce inadequate bond coverage and component to component variation. In an embodiment where the marker material 18 is in powder form, individual particles may have a largest dimension that may set the gap 14. For example, if the particles are round, or roundish etc, a diameter may control the gap. If the particles range in largest dimension, the largest dimension particles may control the gap 14. Particles of specified mesh range are known in the art and may be used for such an application. If the bonding agent is in foil form, marker material 18 may be embedded in the foil any number of ways, including rolling into the foil. Controlling the gap 14 may be particularly useful in components where one component is fitted inside another.

Figure 5:
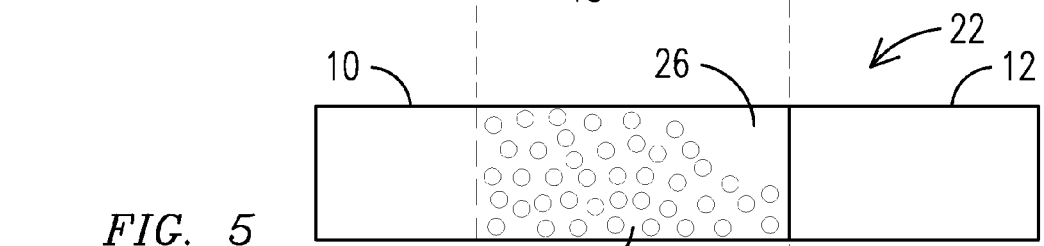
FIG. 5 is a top view of the component of FIG. 4.
Figure 6:
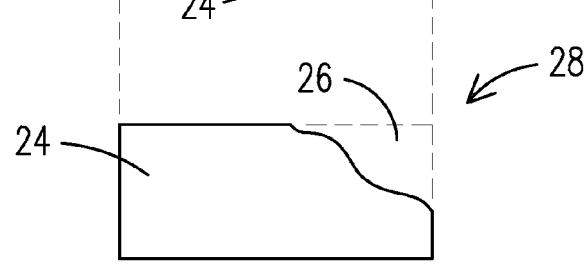
FIG. 6 is a schematic of an intended and actual bond of FIG. 4

FIG. 5 shows a top view of a component 22 produced from the process of FIG. 4. Actual bond 24 is represented by the shaded area and indicates the presence of the marker material 18 (i.e. very dense tungsten particles) as measured through a substrate, which indicates an actual bond. Unbonded area 26 as indicated by the unshaded area indicates a lack of presence of the marker material 18, which indicates a lack of an actual bond in an area where bonding agent 16 was expected, i.e. in an intended bond. FIG. 6 depicts the actual bond 24, and an intended bond 28, which is the actual bond 24 and the unbonded area 26 together. From this it is clear that bonding agent coverage, and hence bond quality can readily be evaluated without destroying the component 22.

In an embodiment the marker material 18 may have a different radioactivity than the substrate. For example, the first substrate 10 and second substrate 12 may be a non radioactive nickel based superalloy, and the bonding operation may be a brazing operation. The bonding agent may be braze material "BNi-2." A marker material 18 with a radiation emitting quality may be used. An example, but not meant to be limiting, may be a marker material 18 that emits gamma radiation. In an embodiment but not meant to be limiting a marker material 18 may be thorium. As above, the marker material 18 with the different radioactivity may be infused into the bonding agent 16, the bond created, and then the joint inspected looking for evidence of the marker material (by looking for its radioactive emissions) in the joint, to determine bonding agent coverage and the associated actual bond.

Figure 7:
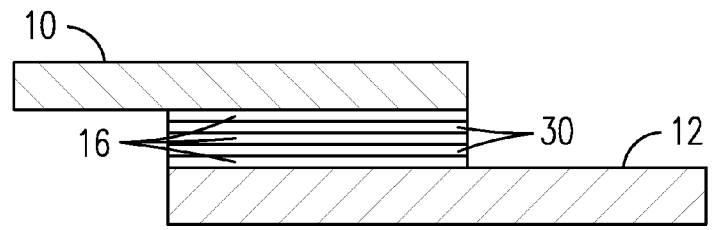
FIG. 7 is a side view of a component with a marker material having a high coefficient of thermal expansion, when at a high bonding process temperature.
Figure 8:
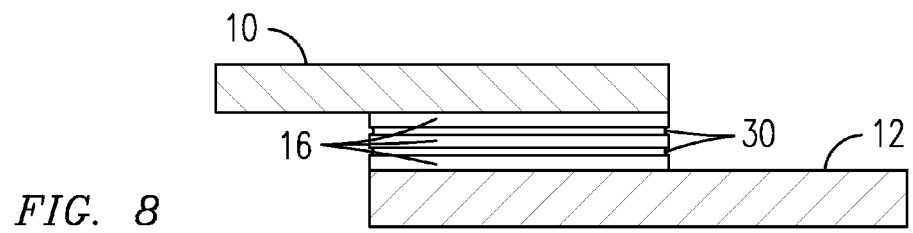
FIG. 8 is the component of FIG. 7 once cooled.

The marker material 18 may serve yet another function. If a marker material 18 is selected that has a coefficient of thermal expansion (CTE) greater than that of the bonding agent into which it is infused, then during the bonding process when the bonding agent and marker material are cooled the marker material will shrink relatively more than will the bonding agent surrounding it. (During the prior heating portion the bonding agent may simply yield and move within the joint to the relatively expanding marker material.) As shown in FIG. 7, at bonding process high temperature the higher CTE marker material 30 and bonding agent 16 fill the joint. As shown in FIG. 8, as the higher. CTE marker material 30 cools and contracts relatively more than the bonding agent 16, it will impart a compressive force on the bonding agent, which in turn imparts a compressive force on the entire joint. This may be desirable because joints pre-stressed under compressive force may be able to tolerate greater mechanical loads.

Figure 9:
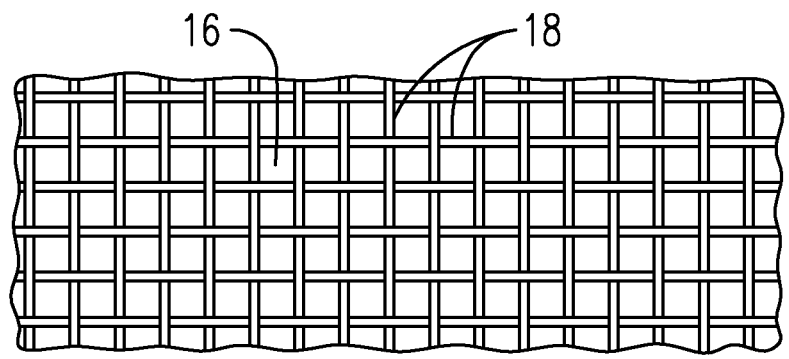
FIG. 9 is a schematic of an embodiment of a marker material infused bonding agent.
Figure 10:
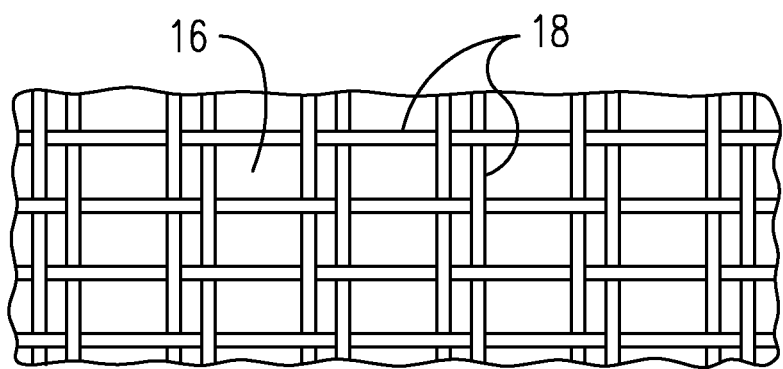
FIG. 10 is a schematic of another embodiment of a marker material infused bonding agent.
Figure 11:
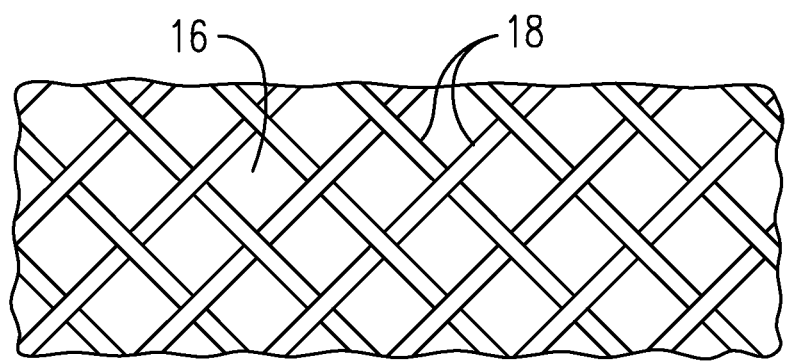
FIG. 11 is a schematic of yet another embodiment of a marker material infused bonding agent.

Particular shapes for marker material with a higher CTE than the bonding agent may increase the compress force. For example, if the high CTE marker material takes an elongated shape, such as a cylinder or wire, once cooled the higher CTE marker material would shrink more in absolute terms since its length is longer. Increasing the amount of shrinkage in the joint may increase the compressive load in the joint. This shrinkage may be randomly directional, or may be designed to be directional. For example, if compression along a particular axis is desired, then the high CTE material may be oriented length-wise along that direction so that when cooled the compressive force is where it is desired. A mesh may be employed to generate compressive forces in at least two directions. If enough mesh is used and a joint is annular, such as brazing one round part inside another, then mesh may also create a radially inward compressive force. The same could be accomplished with lengths of wire shaped high CTE marker material positioned such that it is "wrapped" around the inner component. As seen in FIG. 9, the mesh of marker material 18 may be evenly distributed in the bonding agent 16, or as seen in FIG. 10, it may be patterned other than even between all strands. A pattern shown in FIG. 11 could be used to generate forces in multiple directions using individual wire marker material, or mesh. These examples only typify the possibilities and are not meant to be limiting. Any configuration may be used to reach any compressive force scheme within a joint.

The bonding process may be any suitable process. Brazing has primarily been discussed up to this point, but other viable processes that may employ the teachings herein include, but are not limited to soldering, solid state diffusion bonding (welding), and transient liquid phase bonding. Both brazing and soldering require a gap. In such processes the bonding agent may be disposed in at least part of the joint prior to heating, and may melt and travel into the joint during the heating process. Both of these processes lend themselves well to NDE as disclosed herein. Soldering may also take advantage of sized marker material in order to ensure proper fit in certain circumstances, though brazing may be able to more fully utilize that advantage of the teachings herein.

Diffusion bonding, sometimes referred to as diffusion welding, is in the most general terms a solid state process where two substrates are pressed together at an elevated temperature below their melting points. The materials diffuse into each other and create a bond. Sometimes an interlayer (i.e. a diffusion aid also called a bonding agent herein), may be used to facilitate diffusion. When such a diffusion aid/bonding agent is used in diffusion bonding, the bonding agent is not melted, but instead acts to facilitate the diffusion of the substrates. In the process the bonding agent also diffuses into at least one of the substrates, and once the process is completed, the bonding agent no longer exists as a layer between the substrates.

Transient liquid phase bonding is another process that is similar to diffusion bonding but differs in that an interlayer (i.e. the bonding agent) is used, the bonding agent is melted, and the bonding agent eventually also diffuses into at least one of the substrates to form a joint. Once the process is completed, the bonding agent no longer exists as a layer between the substrates. Diffusion bonding when using an interlayer as well as transient liquid phase bonding differ from soldering and brazing in that a gap is not desired. However, both can still employ the teachings used herein.

Figure 12:
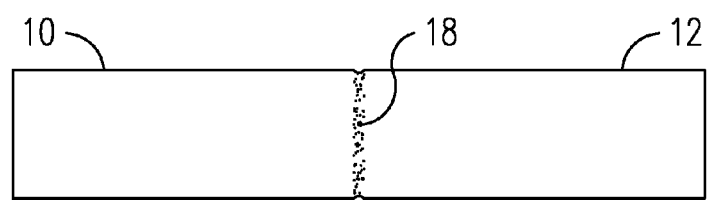
FIG. 12 is a schematic of a component bonded using a bonding agent that diffused into the substrate and a marker material that did not diffuse.

Specifically, a marker material of the desired different physical property may be disposed in the interlayer (i.e. bonding agent), and then either bonding process proceed as usual. In an embodiment the marker material may maintain is original state, and not diffuse into the substrates. In such a scenario, as shown in FIG. 12, the bond may simply form around the marker material 18. A full bond may be prevented by the presence of the marker material, but this may be an acceptable scenario under certain circumstances. Upon completion of the bonding process the joint may be evaluated in accord with the chosen different physical property. Presence of the different physical property indicates the presence of the interlayer. Since the interlayer is a diffusion aid, proper diffusion of the substrates proximate the interlayer may be presumed. As a result, the bond can be evaluated and compared to an intended bond.

Figure 13:
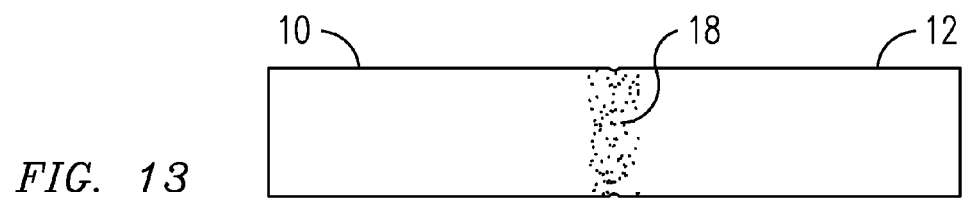
FIG. 13 is a schematic of a component bonded using a bonding agent that diffused into the substrate and a marker material that also diffused.

In another embodiment shown in FIG. 13, in the diffusion bonding techniques described above, the marker material 18 may also diffuse into the substrates in a manner representative of a diffusion of the substrates. In this embodiment the marker material may be infused into the interlayer as desired and the bonding process proceed as usual. Upon completion of the process the joint may be evaluated in accord with the chosen different physical property. Presence of the different physical property indicates the presence of the interlayer, and since the interlayer is a diffusion aid, proper diffusion of the substrates proximate the interlayer may be presumed. However, in this embodiment the evaluation may go one step further and look into the substrate to see if the marker material has diffused, and if so, to what extent. If the marker material has diffused, and if the diffusion of the marker material is representative of the diffusion of the substrates, then it may be presumed that the substrates diffused and therefore the bond was properly formed. The marker material may diffuse in exactly the same manner as the substrates, or differently, but in a way that enables one to determine diffusion of the substrates. For example, the marker material may diffuse half as much as the substrates. Any diffusion of the substrates may then be presumed as twice that of any evaluated diffusion of the marker material. The relationship need not be linear, and may be any relationship. All that is important is that the diffusion of the substrates be suitably ascertainable from the diffusion of the marker material. An example of the application of such marker could involve the boron isotope 10. That is, boron is widely applied as a melting point suppressant in TLP braze alloys. If boron 10 with a high neutron-capture cross-section is used as the marker (and melting point suppressant), it could diffuse atomically, accomplish the TLP bonding, and be subsequently inspected for by neutron radiography.

It has been disclosed that the present inventor has devised a clever method of non destructively evaluating bonding agent coverage and associated bonds within joints created during a variety of bonding processes. The disclosed technique enables the use of a wider variety of marker materials while simultaneously improving the quality and variety of NDE techniques that can be used to evaluate the bonding agent coverage and associated bond within a joint. The technique can readily be implemented with minimal financial investment because it relies on tools and materials common in the art that simply have not been used in this manner before, and represents a significant improvement over the current state of the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of determining bonding agent coverage in a joint between a first substrate and a second substrate, comprising:
dispersing a marker material throughout a bonding agent, wherein the bonding agent comprises a metal in an unmelted state;
melting the metal during a brazing process but not melting the marker material;
solidifying the melted metal to form an actual bond in a joint between the first substrate and the second substrate;
detecting the marker material in the joint through at least one of the substrates to ascertain an actual bond; and
comparing the actual bond to an expected bond for the joint to determine the bonding agent coverage,
wherein the first substrate and the second substrate are nickel-based alloys,
wherein the bonding agent comprises nickel based brazing filler metal comprising: 3.10% boron; 7.0% chromium; 3.0% iron, 82% nickel; and 4.5% silicon, and
wherein the marker material is tungsten.

2. A method of determining bonding agent coverage in a joint between a first substrate and a second substrate, comprising:
infusing a bonding agent with a marker material;
distributing bonding agent comprising metal in an unmelted state and marker material between the first substrate and the second substrate at a location of the joint;
forming the joint by solid state diffusion bonding, wherein the marker material diffuses into the substrates during the solid state diffusion bonding;
detecting through at least one of the substrates an extent of diffusion of the marker material into at least one of the substrates to ascertain an actual bond; and
comparing the actual bond to an expected bond for the joint to determine the bonding agent coverage.

3. The method of claim 2, wherein the marker material comprises a different neutron capture, and detecting an extent of diffusion comprises neutron radiography.

4. The method of claim 3, wherein the marker material comprises boron isotope 10.

5. A method of determining bonding agent coverage in a joint between a first substrate and a second substrate, comprising:
dispersing a marker material throughout a bonding agent, wherein the bonding agent comprises a metal in an unmelted state;
melting the metal during a brazing process but not melting the marker material;
solidifying the melted metal to form an actual bond in a joint between the first substrate and the second substrate;
detecting the marker material in the joint through at least one of the substrates to ascertain an actual bond; and
comparing the actual bond to an expected bond for the joint to determine the bonding agent coverage,
wherein the first substrate and the second substrate are nickel-based alloys,
wherein the bonding agent comprises nickel base brazing filler metal comprising: 3.10% boron; 7.0% chromium; 3.0% iron, 82% nickel; and 4.5% silicon, and
wherein the marker material is iron.

6. A method of determining bonding agent coverage in a joint between a first substrate and a second substrate, comprising:
dispersing a marker material throughout a bonding agent, wherein the bonding agent comprises a metal in an unmelted state;
melting the metal but not the marker material;
solidifying the melted metal to form an actual bond in a joint between the first substrate and the second substrate;
detecting the marker material in the joint through at least one of the substrates to ascertain an actual bond; and
comparing the actual bond to an expected bond for the joint to determine the bonding agent coverage,
wherein the marker material comprises a radioactive property.

7. The method of claim 6, wherein the first substrate and the second substrate are nickel-based alloys, wherein melting the metal and solidifying the melted metal are steps in a brazing process, wherein the bonding agent comprises nickel base brazing filler metal comprising: 3.10% boron; 7.0% chromium; 3.0% iron, 82% nickel; and 4.5% silicon, and wherein the marker material is thorium.

8. A method of determining bonding agent coverage in a joint between a first substrate and a second substrate, comprising:
dispersing a marker material throughout a bonding agent, wherein the bonding agent comprises a metal in an unmelted state;
melting the metal via a transient liquid phase bonding process but not melting the marker material, wherein during the transient liquid phase bonding process the marker material diffuses with the metal;
solidifying the melted metal to form an actual bond in a joint between the first substrate and the second substrate;
detecting through at least one of the substrates an extent of diffusion of the marker material into at least one of the substrates to ascertain the actual bond, and
comparing the actual bond to an expected bond for the joint to determine the bonding agent coverage.

9. The method of claim 8, wherein the marker material comprises a different neutron capture characteristic and detecting an extent of diffusion of the marker material comprises neutron radiography.

10. The method of claim 8, wherein the marker material comprises boron isotope 10.

* * * * *